Patented Apr. 18, 1950

2,504,518

UNITED STATES PATENT OFFICE 2,504,518

SYNTHETIC DRYING COMPOSITIONS

Sylvan Owen Greenlee, Louisville, Ky., assignor to Devoe & Raynolds Company, Inc., Louisville, Ky., a corporation of New York No Drawing. Application May 2, 1946, Serial No. 666,835

1 Claim. (Cl. 260—22)

This invention relates to new synthetic drying compositions and more particularly to esters of high molecular weight resinous polyhydric alcohols with polybasic acids and monobasic acids such as higher unsaturated fatty acids and resin acids.

The new compositions are valuable varnishes and drying compositions having improved properties, including improved resistance to alkali, water and chemicals, improved hardness and flexibility, improved drying properties, improved body, gloss and adhesion to surfaces and other desirable properties.

The new synthetic composite ester compositions are made by the esterification with polybasic acids and monobasic acids of high molecular weight resinous polyhydric alcohols and more particularly of high molecular weight polymeric polyhydric polyether alcohols which are polyether derivatives of polyhydric phenols having hydroxyl containing aliphatic radicals united to the phenolic residues through ether linkages. Such high molecular weight polyhydric alcohols can readily be made of semi-solid or solid consistency and of high molecular weight.

Drying compositions have heretofore been made from polyhydric alcohols such as glycerin, polybasic acids and monobasic acids.

According to the present invention, instead of using a relatively low molecular weight polyhydric alcohol, such as glycerin, with polybasic acids and monobasic acids to produce drying compositions, the new compositions are produced with the use of high molecular weight polyhydric alcohols which are resinous in character and have an unusually high molecular weight as well as a relatively large number of esterifiable hydroxyl groups; and these high molecular weight resinous polyhydric alcohols are esterified in part with polybasic acids and in part with high molecular weight monobasic acids. The high molecular weight polyhydric alcohols used, because of their high molecular weight and large number of hydroxyl groups and their resinous character, enable valuable drying compositions to be produced with the use of monobasic acids of a relatively low degree of unsaturation such as those of semi-drying and non-drying oils and tall oil acids, when used together with polybasic acids.

The polybasic acids which react with the high molecular weight resinous polyhydric alcohols serve to cross-link different molecules of the polyhydric alcohols and may also esterify different hydroxyls of the same molecule. The large number of hydroxyl groups of the polymeric polyhydric alcohols enable a large number of ester radicals or groups to be combined therewith, such that the polybasic acids may in part be combined with the same polyhydric alcohol molecules to form ring compounds, and in part with different polyhydric molecules to bring about cross-linking. The large number of hydroxyl groups of the polymeric polyhydric alcohols also enables a sufficient number of ester groups of monohydric acids or resin acids or mixed fatty and resin acids to be secured thereto to give valuable drying properties even from acids of relatively low degree of unsaturation.

The high molecular weight resinous polyhydric alcohols which are subjected to esterification to produce the new esters, are advantageously prepared by the reaction of polyhydric phenols with polyhalo alcohols, epihalohydrins, or polyepoxide compounds to form complex reaction products containing several alcoholic hydroxyl groups per molecule. In certain cases the halohydrins or epoxy compounds used in making the polyhydric alcohols introduce epoxy groups as well as alcoholic hydroxyl groups into the high molecular weight product to give products which are hydroxy-epoxy products containing a plurality of alcoholic hydroxyl groups and one or more epoxy groups. For purposes of esterification epoxy groups when present act for the most part as glycol groups in reaction with organic acids, one epoxide group being in general equivalent to two alcoholic hydroxyl groups. The production of various high molecular weight polyhydric alcohols suitable for use in making the new drying compositions of the present invention is described in my prior applications Serial Nos. 502,317, filed September 14, 1943, now U. S. Patent No. 2,456,408, 535,342, filed May 12, 1944, 617,176 and 617,178, filed September 18, 1945, 626,449, filed November 2, 1945, and 621,856, filed October 11, 1945.

In my prior applications Serial Nos. 502,317, 535,342 and 617,178 I have described the preparation of polyhydric alcohols derived by the reaction of polyhydric phenols with polyhalohydrins, epihalohydrins, and polyepoxides both without and with the use of monofunctional reactants. By regulating the quantities and proportions of the reactants complex reaction products of predetermined molecular weights and predetermined hydroxyl contents can be obtained. Where chlorhydrins such as epichlorhydrin, glycerol dichlorhydrin or glycerol monochlorhydrin are used the reaction is carried out in the presence of caustic soda equal to or somewhat in excess of the amount required to combine with all of the halogen of the halohydrin. Such complex polyhydric compositions and particularly such compositions as are solid at ordinary temperature and those of much higher melting point are useful in the preparation of the new drying compositions of the present invention. In my application Serial No. 617,178, filed September 18, 1945, I have further described complex polyhydric alcohols which can also be similarly used in making the new products.

In my prior application Serial No. 617,176, filed September 18, 1945, I have further described complex reaction products of polyhydric phenols with polyfunctional halohydrins such as epichlorhydrin and glycerol dichlorhydrin with the difunctional chlorhydrin used in proportions in excess of that equivalent to the polyhydric phenol and less than twice the equivalent amount, with the addition of caustic alkali equal to or somewhat in excess of the amount required to combine with the halogen of the halohydrin and giving complex polymeric products containing both epoxy groups and hydroxyl groups. Such complex polymeric epoxy-hydroxy products and compositions are also advantageously used for reaction with polybasic acids and monobasic acids to form the new drying compositions of the present invention. The complex epoxy-hydroxy compositions of my prior application Serial No. 621,856, filed October 11, 1945, can similarly be used.

In my companion application, Serial No. 626,449, filed November 2, 1945, I have described new polyepoxy products and compositions obtained by the direct addition of polyhydric phenols and polyepoxides, with the proportion of polyepoxides used in excess of the equivalent amount so that the resulting reaction products contain epoxy groups. Such polyepoxy reaction products and particularly those which are solids at room temperature are advantageously used in making the new drying compositions of the present invention.

The polyhydric alcohols used, regardless of the method of their production, are advantageously solids at ordinary temperature and in many cases products of much higher melting point are desirable. The polymeric polyhydric alcohols produced by the reaction of polyhydric phenols and polyfunctional aliphatic reactants such as polyhalohydrins, epihalohydrins and polyepoxides are complex reaction products but in general, and assuming a straight line reaction and polymerization, they contain alternating aromatic nuclei from the polyhydric phenol and aliphatic hydroxyl containing nuclei united through ether linkages. When an excess of polyhydric phenol is used some of the phenolic hydroxyl groups may be present in the final product, and products containing such terminal phenolic hydroxyl groups can be used for esterification. In general, however, I consider it more advantageous to use polymeric polyhydric alcohols which are free or relatively free from terminal phenolic hydroxyl groups and which contain instead either terminal non-reactive groups or terminal hydroxyl-containing or epoxy-containing groups.

In such polymeric products made from polyhydric phenols with polyfunctional halohydrins, epihalohydrins and polyepoxides there will in general be one or more alcoholic hydroxyl groups between the phenol residues and there may also be terminal alcoholic hydroxyl groups or epoxy groups.

High melting and high molecular weight products containing a lesser number of hydroxyl groups may be produced e. g., by using mixtures of dichlorhydrins or epichlorhydrins with dichlorides such as dichlordiethyl ether or dichlorbutene. Such dichlorides will give intermediate aliphatic groups between the phenolic residues which do not contain esterifiable hydroxyl groups while the residues formed from the dichlorhydrins or epichlorhydrins will contain esterifiable hydroxyl groups. Similarly products obtained by the reaction of polyhydric phenols with such dichlorides, using the polyhydric phenols in excess, and reacting the resulting complex polyhydric phenols with simple polyepoxides, will give high melting point products having a limited number of hydroxyl and epoxy groups.

The new synthetic drying compositions of the present invention are prepared by esterification of such high molecular weight polyhydric alcohols or epoxy-hydroxy compositions with polybasic acids and monobasic acids.

The polybasic acids (or anhydrides) used together with monobasic acids for esterifying the high molecular weight polyhydric alcohols according to the present invention include polybasic acids such as are commonly used with drying oils (glycerides) and with glycerin and unsaturated higher fatty acids to form the so-called alkyd or glyptal resins having drying properties. Among such polybasic acids are included phthalic acid, succinic acid, maleic acid, adipic acid, etc., and their anhydrides.

The monobasic acids which are used with the polybasic acids for esterifying the high molecular weight resinous polyhydric alcohols include the fatty acids of drying oils such as linseed oil, etc., as well as the unsaturated acids of semidrying and non-drying oils. Various monobasic resin acids can also be used, as well as mixed resin acids and fatty acids such as occur in tall oil acids.

The proportions of polybasic acids and monobasic acids used with the high molecular weight resinous polyhydric alcohols can be varied, and mixtures of different polybasic acids and of different monobasic acids can also be used. When naturally occurring or previously formed esters of other alcohols are added, complex and modified reaction products and reaction mixtures can be produced.

The preparation of the new synthetic drying compositions will be illustrated by the following examples, but it will be understood that the invention is not limited thereto.

*Example I.*—The high molecular weight polyhydric alcohol is made as follows: In a 300-gallon stainless steel kettle, equipped with an agitator, was added 866 lbs. of water, 392 lbs. of bisphenol, and 80 lbs. of caustic soda. The reaction mixture was agitated and gradually heated to 40° C., at which time 52.64 lbs. of phenol was added. With continuous agitation, 185 lbs. of epichlorhydrin was added, and the temperature rose spontaneously to 70° C. over a period of 45 minutes. At this point 20 lbs. of caustic soda, dissolved in 20 lbs. of water was added, and the resulting mixture was heated gradually to 93° C. and held at 93 to 100° C. for 1 hour.

The upper water salt layer was removed by decantation, boiling water was added, and the resinous mixture was stirred with heating for about 15 minutes, at which time the wash water was again removed by decantation. The washing was repeated three more times, adding a small amount of acetic acid to the second and third wash to keep the washings slightly acid to litmus. After the final washing the resin was dried by heating until the temperature had reached 150° C. The resulting product had a softening point of 110° C.

In a reaction vessel or kettle provided with a mechanical agitator and a condenser of the Bidwell-Sterling type were placed 8.8 parts of maleic anhydride, 312 parts of oleic acid and 403 parts of the above polyhydric alcohol. Sufficient xylene was added to give refluxing during esterification. The resulting mixture was heated with agitation for about two hours at 220–225° C. to give a wax-like product having an acid value of 35.6

This product dissolved in xylene and treated with cobalt drier gave films which baked to hard, tough, glossy films.

*Example II.*—According to the procedure of Example I, 20 parts of phthalic anhydride, 184 parts of oleic acid and 280 parts of the same polyhydric alcohol used in Example I were heated for six hours and fifteen minutes at 250° C. to give a wax-like product having an acid value of 8.6.

This product dissolved in xylene and treated with cobalt drier gave excellent baked film.

*Example III.*—In a 10-gallon stainless steel pressure kettle, provided with a mechanical agitator, was placed 10.58 lbs. of bisphenol, .82 lbs. of phenol, and 2 lbs. of sodium hydroxide dissolved in 2½ gallons of water. The resulting mixture was agitated until a homogeneous solution was obtained. To this mixture was added 4.63 lbs. of epichlorhydrin, and the resulting mixture was gradually heated until a temperature of 63° C. was reached. At this point, ½ lb. of sodium hydroxide was added, the kettle was closed so as to stand steam pressure and the reaction mixture was gradually heated with continuous agitation to 116° C. and held at 116–123° C. for ½ hour. After allowing the mixture to cool to a temperature below the boiling point of water, the upper water salt layer was removed by decantation. The resulting taffy like resin was washed four times with water containing sufficient acetic acid to neutralize the caustic, heating the resin with the wash water to 120° C. and agitating for about 15 minutes. After the final wash, the resin was dried by heating to 175° C. The resulting product had a softening point of 132° C.

A rosin maleic anhydride adduct was prepared by heating 350 parts of W. G. rosin with 35 parts of maleic anhydride at 250° C.

A mixture of 27.4 parts of the rosin maleic anhydride adduct, 200 parts of the above polyhydric alcohol and 145 parts of dehydrated castor oil acids was heated with continuous agitation at 230–235° C. while passing carbon dioxide through the mixture continuously for four hours and thirty-five minutes to give a product having an acid value of 11.2.

A solution of this product in hydrocarbon solvents treated with cobalt drier gave varnish films which air-dried tack-free in two hours.

*Example IV.*—A mixture of 68.5 parts of the rosin-maleic adduct used in Example III, 500 parts of the polyhydric alcohol used in Example III, and 350 parts of linseed oil acids was heated with continuous agitation for five hours and fifteen minutes at 250° C. while passing carbon dioxide through the mixture continuously to give a product having an acid value of 11.3.

This product is a waxy solid at room temperature, and its solutions in aromatic solvents treated with driers gave varnish films which were tack-free after thirty minutes air drying.

In the above examples the amount of higher unsaturated monobasic acids is somewhat less than the weight of the high molecular weight resinous polyhydric alcohol esterified and the proportion of polybasic acid is only a minor percent of the weight of the monobasic acid, being 2.8% in Example I, 10.9% in Example II, 18.9% in Example III and 19.6% in Example IV.

Other resinous polymeric polyhydric alcohols such as those described in said prior applications can similarly be used and esterified with polybasic acids and monobasic acids to give new composite drying compositions. Thus, polymeric polyhydric alcohols containing a number of intermediate hydroxyl groups and which do not contain terminal hydroxyl groups can be esterified; as well as polymeric polyhydric alcohols which contain terminal hydroxyl groups or terminal epoxide groups or both terminal hydroxyl and epoxide groups, as described in said prior applications.

The present invention enables improved composite drying esters and compositions to be obtained, even when the monobasic acids used are of relatively low unsaturation.

The presence of a large number of hydroxyl groups in the high molecular weight polymeric polyhydric alcohols enables a correspondingly increased number of ester groups to be united to a single alcohol molecule while enabling cross-linking of different molecules to take place through the polybasic acids or portions thereof. The resinous nature of the high molecular weight polymeric polyhydric alcohols, including polymeric alcohols which are hydroxy epoxides, appears to play an important part in giving to the new composite drying ester compositions valuable drying and other properties such as those previously referred to.

I claim:

A new composite drying composition, the same being a mixed ester of maleic anhydride, oleic acid and a high molecular weight resinous polymeric polyhydric alcohol which is a polymeric polyether derivative of 4,4'-dihydroxydiphenyl-2,2-propane having alternating aliphatic chains derived from epichlorhydrine and aromatic 4,4'-diphenyl-2,2-propane nuclei united through ether oxygen and being free from functional groups other than epoxy and hydroxyl groups, the proportion of oleic acid being less than the weight of the resinous alcohol and the proportion of maleic anhydride being from about 2.8% to about 19.6% of the oleic acid.

SYLVAN OWEN GREENLEE.

REFERENCES CITED

The following references are of record in the file of this patent:

UNITED STATES PATENTS

| Number | Name | Date |
|---|---|---|
| 1,853,049 | Hoover | Apr. 12, 1932 |
| 2,060,715 | Arvin | Nov. 10, 1936 |
| 2,078,239 | Ellis | Apr. 27, 1937 |
| 2,213,477 | Steindorff et al. | Sept. 3, 1940 |
| 2,324,483 | Castan | July 20, 1943 |

FOREIGN PATENTS

| Number | Country | Date |
|---|---|---|
| 470,181 | Great Britain | Aug. 3, 1937 |
| 576,177 | Germany | May 8, 1933 |

OTHER REFERENCES

Ellis, Chem. of Synthetic Resins, vol. 2, 1935, pages 921 and 922.

Mattiello, Protective and Decorative Coatings, vol. 1, 1941, page 339.

Rinse, Paint Technology, Nov. 1946, pages 429 and 430.

Kienle et al., Industrial & Eng. Chem. (April 1929), vol. 21, No. 4, pages 349–352.